INVENTOR
RAY A. YORK
HSIEN BING WANG

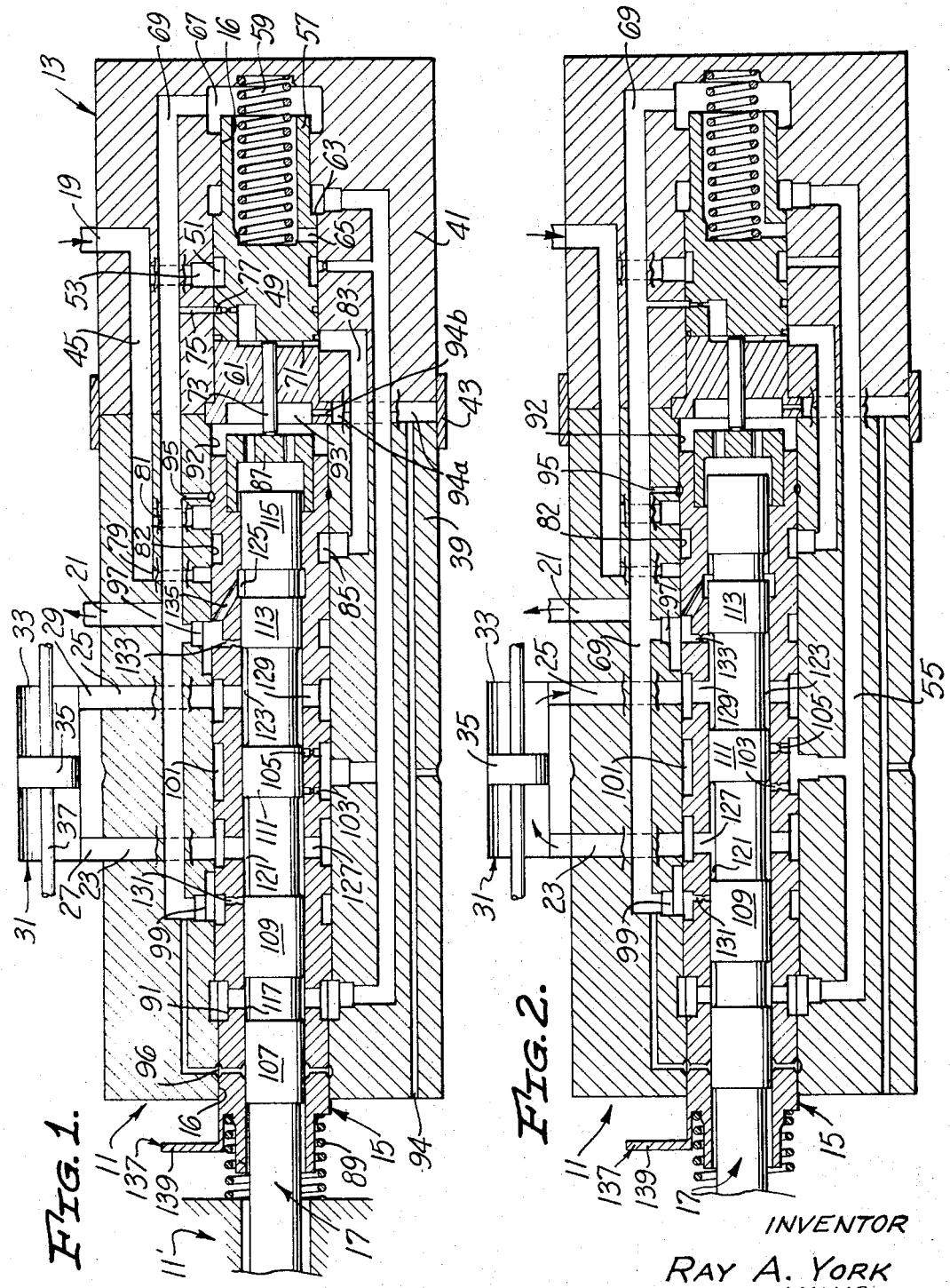

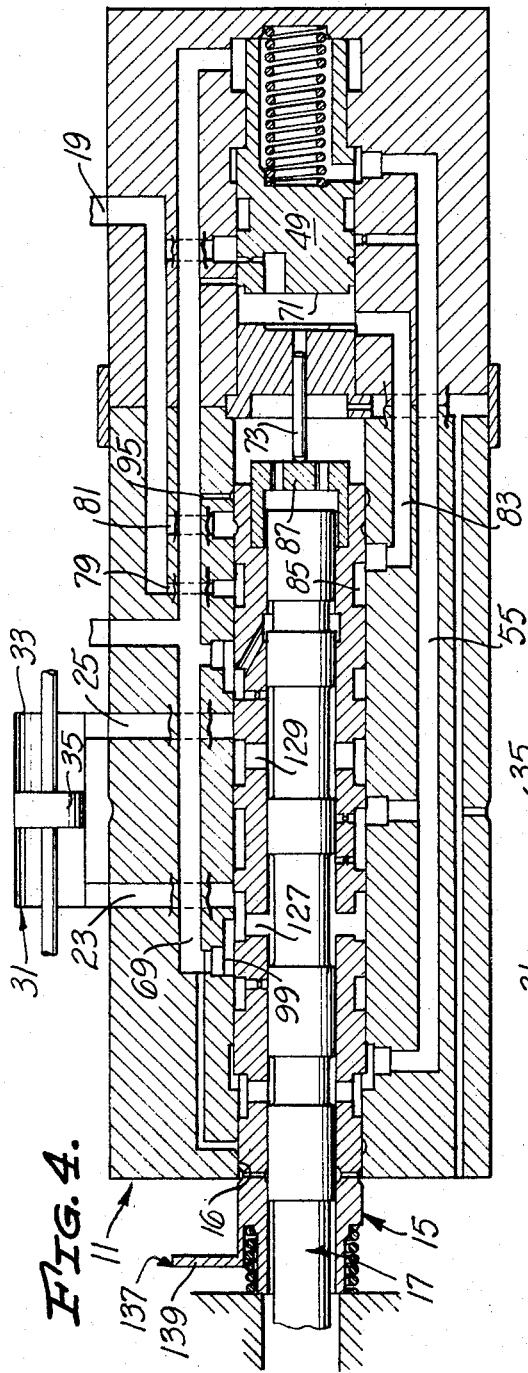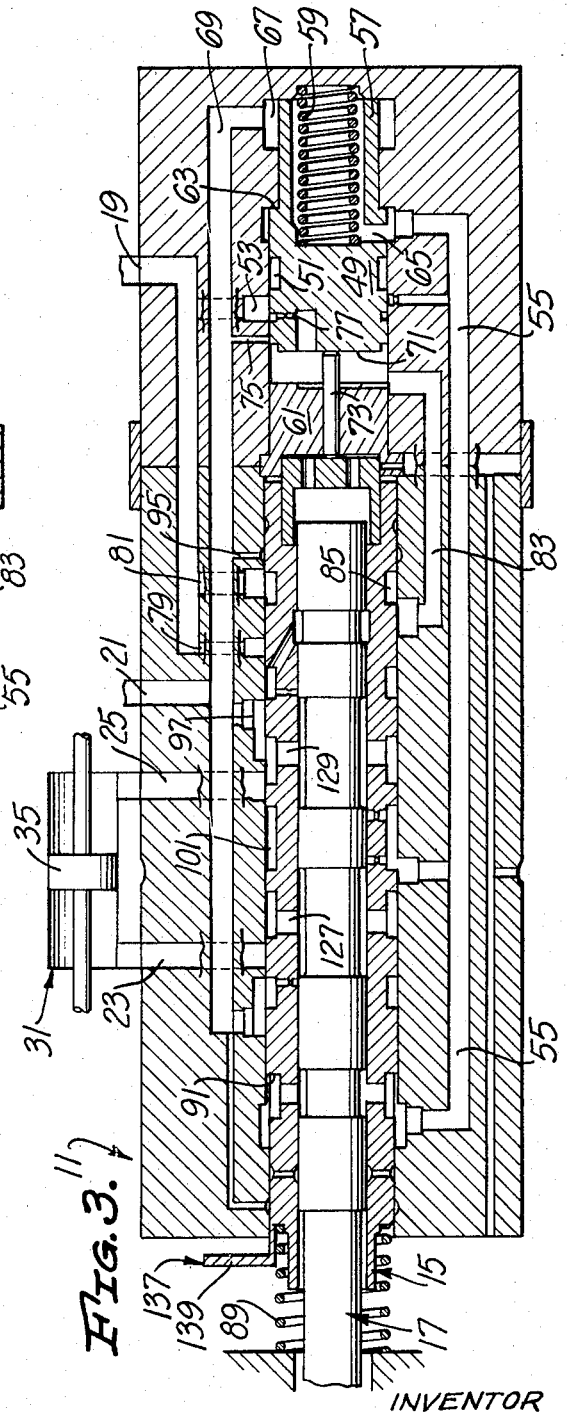
INVENTOR
RAY A. YORK
HSIEN BING WANG

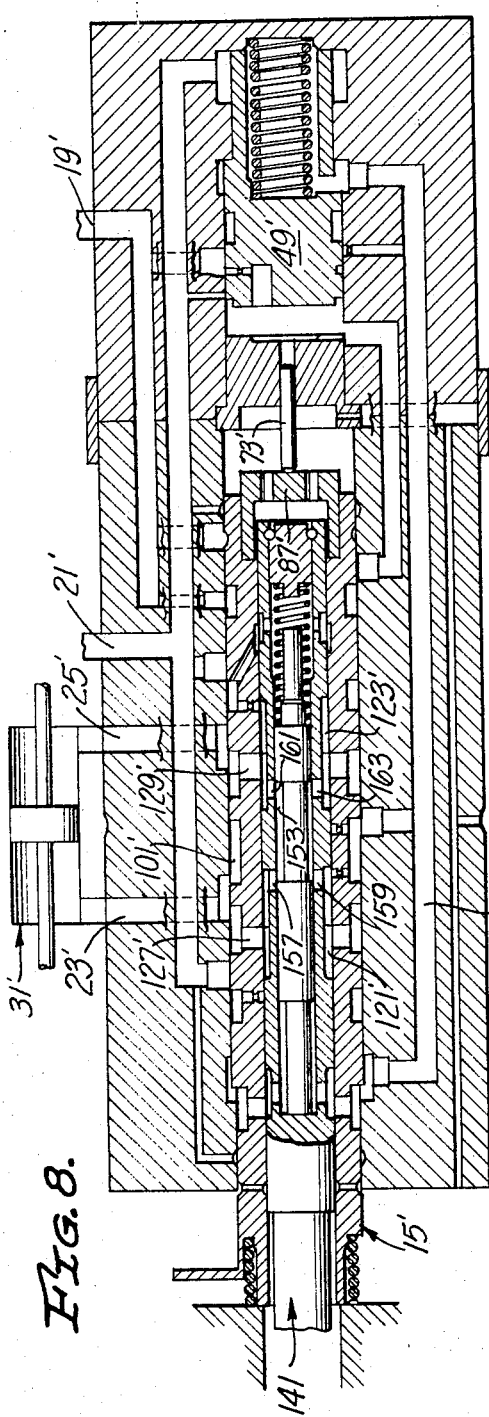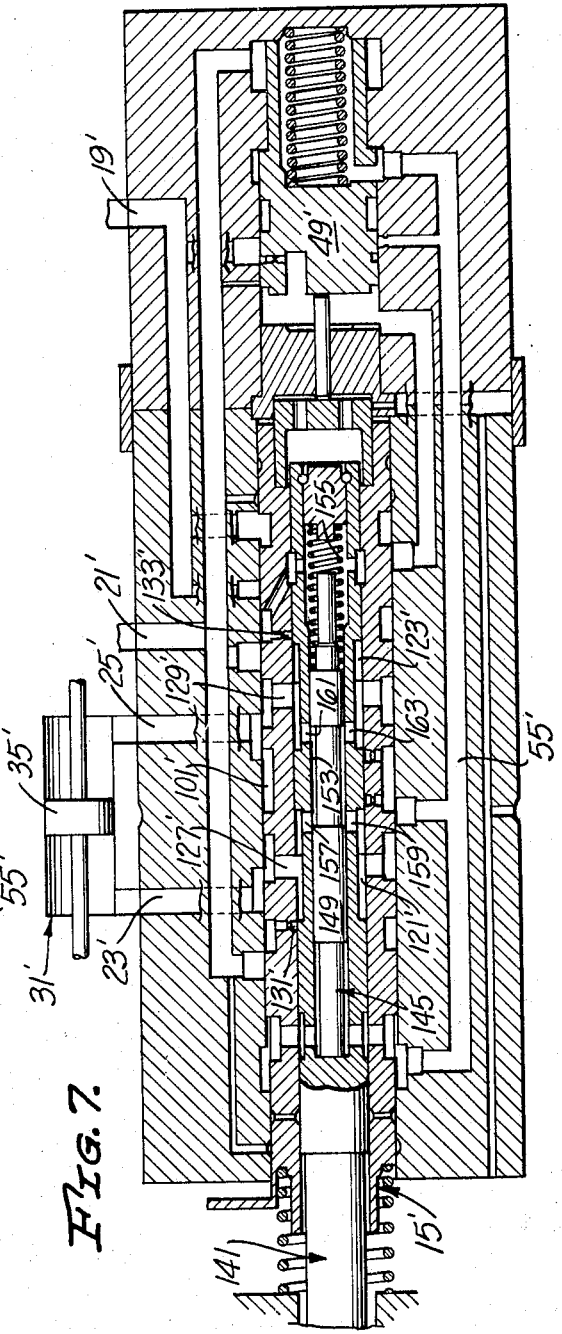

United States Patent Office 3,439,707
Patented Apr. 22, 1969

3,439,707
FAIL-SAFE SERVO VALVE
Ray A. York, Pasadena, Calif. (12461 NE. Bellevue-Redmond Road, Bellevue, Wash. 98004), and Hsien Bing Wang, Orange, Calif.; said Wang assignor to Bertea Corporation, Irvine, Calif., a corporation of California
Filed Feb. 2, 1967, Ser. No. 613,582
Int. Cl. E16k 31/12
U.S. Cl. 137—596    23 Claims

ABSTRACT OF THE DISCLOSURE

This disclosure describes a fail-safe servo valve for controlling an actuator. The servo valve includes a housing having a bore therein, a sleeve slidably mounted in the bore, and an elongated actuator valve slidably mounted in the sleeve. The actuator valve is movable to control flow of an operating fluid to the actuator to control the latter. In the event that the actuator valve jams in the sleeve, the sleeve moves with the actuator valve to disable it and prevent the servo valve from controlling the actuator.

Background of the invention

This invention relates to a fail-safe servo valve of the type particularly adapted for controlling a hydraulic actuator in an aircraft.

As is well known, every aircraft is provided with many control surfaces which are used to control the movements of the aircraft when it is in flight. If the control surfaces are not properly actuated, the pilot may lose control of the aircraft and a crash may result. It is very important, therefore, that very reliable equipment be used to operate the control surfaces.

It is common practice to utilize hydraulic actuators to control the movements of the various control surfaces of an aircraft. Because of the importance of proper control, two actuators are often used to operate a single control surface. Although both of the actuators are operable simultaneously by the movement of a single control mechanism within the cockpit of the aircraft, in the event of a failure of one of the actuators, the other actuator is capable of independently controlling the movements of the control surfaces.

Each of the actuators are in turn operated by a servo valve. It is, of course, very important that the servo valves function properly, and accordingly, many of the servo valves incorporate a fail-safe feature therein.

A typical prior art servo valve includes a housing, a radially apertured slidable sleeve mounted in the housing, and a valve of the spool type slidably mounted in the sleeve. The sleeve is normally held against movement relative to the housing to allow the valve to slide relative to the sleeve. The movements of the valve control the flow of an operating fluid through the servo valve to the actuator and therefore control the rate of movement and the position of the actuator and of the control surface operated thereby. The movements of the valves are controlled by the pilot. The sleeve is normally held against movement by springs acting thereagainst to urge the sleeve against an abutment within the housing.

One failure that can occur in this type of servo valve occurs when the valve becomes stuck or jammed within the sleeve. This may be the result of contaminants on the valve-sleeve interface, warpage, thermal expansion or contraction of the elements of the servo valve or numerous other reasons. When this jamming action occurs, the slidable sleeve moves with the valve and this prevents the valve from properly controlling the flow of fluid to and from the hydraulic actuator.

In an attempt to overcome this problem, one prior art servo valve includes a series of grooves and passageways in the sleeve so that when jamming occurs and the sleeve moves with the valve, these grooves and passageways would neutralize or override the function of the valve. That is, these grooves and passageways in the sleeve would then become operative to control the flow of fluid to the hydraulic actuator.

One disadvantage of this type of servo valve is that when jamming or seizure occurs, the valve must continuously be operated against the biasing force of the springs which tend to prevent the sleeve from moving. Thus, this system requires the pilot to exert considerable actuating force to control the aircraft. Another disadvantage of this prior art device is that for a hardover failure, the actuator can only be neutralized and cannot be controlled even with the operative unit. Furthermore, this type of servo valve is quite expensive in that it requires close axial tolerances between the sleeve and the body.

In other prior art constructions, attempts have been made to effectively disengage the failed servo valve from the hydraulic actuator associated therewith and to allow the alternate valve and its actuator to independently control the particular control surface. This type of servo valve has not proved satisfactory in that the disengagement of the failed servo valve from its associated actuator has not been complete. This results in the actuator for the failed servo valve affording a resistance to, or otherwise exerting a control influence on, the movements of the control surface. This effect is undesirable because of the increased actuating force required on the part of the pilot and because of the unpredictable influence that the failed servo valve exerts on the control surface. Still another problem with this construction is that no provision has been made for shutting off the supply of operating fluid to the servo valve, and accordingly, operating fluid is wasted during periods of servo valve failure.

Summary of the invention

The present invention provides a fail-safe servo valve which in the event of failure thereof becomes completely incapable of exerting any control function on the particular control surface. This allows the control surface to be controlled by the other actuator therefore without any interference from the failed servo valve. If the servo valve of this invention fails, it will exert no drag on or resistance to the movement of the unfailed servo valve and the actuator therefor. Furthermore, no operating fluid is wasted during periods of servo valve failure as the supply thereof to the failed valve is automatically shut off in response to the failure. All of the above-noted advantages are obtained with a servo valve that can be constructed at lower cost and with relatively large tolerances.

Briefly stated, the invention includes a housing, a sleeve slidably mounted within the housing, and an actuator valve of the spool type slidably mounted for movement within the sleeve. Means are provided for normally retaining the sleeve against movement relative to the housing. This allows the valve to slide within the sleeve relative thereto. The valve is movable upon actuation of the appropriate control linkage by the pilot to control the flow of the operating fluid from a supply port in the housing to first and second actuator openings in the housing which lead to the hydraulic actuator. The valve is also operative to control the flow of the operating fluid from the actuator openings to a return port in the housing. Two or more of these servo valves are provided for each of the control surfaces and the actuator valves are movable together simultaneously.

In the event of a failure of one servo valve caused by sticking or jamming of the valve to the slidable sleeve, the valve and slidable sleeve are movable together as a unit against the force of the retaining means. One advantage of the present invention is that once jamming occurs and the sleeve moves a predetermined amount, the force exerted by the retaining means in opposition to movement of the sleeve is reduced to substantially zero. Thus, once this retaining force has been initially overcome, the valve and sleeve are slidable together relatively easily within the housing and exert substantially no resistance to the movement of the valve in the operational fail-safe servo valve unit.

This desirable feature of the invention is accomplished by utilizing retaining means which include a pair of springs for normally urging the slidable sleeve in opposite axial directions and by providing differential areas on the sleeve and associated elements of the servo valve which are initially exposed to the operating fluid under pressure. Thus, relatively high forces are initially acting on the slide in opposite directions. To prevent these relatively high oppositely directed forces from merely canceling each other out, the forces applied to one end of the slide are applied through a separate member which is slidable a limited amount in the housing. When failure of the valve occurs, the slidable member is automatically withdrawn and return pressure is supplied to the appropriate differential area or operating fluid under pressure is supplied to a reduced area so that only a very slight force is required to move the slide.

Another feature of this invention is the provision of a second valve means in the housing which is responsive to the sleeve moving more than a predetermined amount for shutting off the supply of operating fluid to the actuator through the failed servo valve. More particularly, the second valve means or the inlet or selector valve has a pressure-responsive face and is movable to block the flow of fluid under pressure through the valve in response to a sufficient pressure acting against the pressure-responsive face. The housing has a pilot valve passage extending from the inlet thereof to the pressure-responsive face and a normally closed pilot valve responsive to the failure of the actuator valve means for opening the pilot valve passage to allow the operating fluid under pressure to act on the pressure-responsive face and move the inlet valve to the closed position thereof in which the flow of fluid under pressure through the valve to the actuator is blocked. Preferably, the pilot valve means includes a grooved portion of the slidable sleeve so that the pilot valve will be automatically opened in response to a predetermined amount of movement of the slidable sleeve.

First passage means interconnect the inlet valve and the actuator valve. Another important function of the inlet valve is to selectively interconnect this first passage means with the inlet which contains operating fluid under pressure and a return conduit leading to a relatively low pressure return reservoir. In the normal operating position of the inlet valve, the first passage means is supplied with operating fluid under pressure; however, when the actuator valve fails, the inlet valve automatically connects the first passage means to the return port or conduit.

Under normal operating conditions, the actuator valve is slidable in the sleeve to control the flow of operating fluid from the first passage means to the actuator. When the actuator valve jams within the sleeve, the openings in the housing and the conduits leading to the actuator are automatically opened to relatively low return pressure so that this actuator can exert substantially no controlling influence on the control surface or otherwise unduly resist the movement thereof.

As the first passage means is automatically connected to the return port by the inlet valve upon failure of the actuator valve, the actuator ports may be supplied with return pressure by interconnecting the first passage means therewith. In one embodiment of this invention, the sleeve is provided with an appropriately positioned and dimensioned groove which is operative to interconnect one of the actuator ports with the first passage means upon failure of the valve and consequent movement of the sleeve.

The inlet valve is normally urged to the normal position thereof by a spring, by supply pressure acting over a first portion of the valve, and by return pressure acting over a second portion of the valve. An abutment prevents the inlet valve from moving past the closed position thereof. A pin is slidably mounted in the abutment and urged outwardly thereof into engagement with the slidable sleeve. Thus, the inlet valve also serves the important function of acting as a portion of the restraining means for restraining the sleeve against movement relative to the housing during normal operation of the servo valve.

When the aircraft is on the ground, it is often desirable to simulate a failure of one of the servo valves to assure that the fail-safe system is operating properly. It is also desirable to make certain that the sliding sleeve is not stuck to the housing. To accomplish these functions a mechanical checker is drivingly connected to the slidable sleeve. An actuating portion of the mechanical checker is accessible so that an aircraft mechanic can manipulate the actuating portion and cause the sleeve to move relative to the housing. This assures that the sleeve is not stuck to the housing and also simulates a failure of the servo valve.

According to the first and simpler embodiment of the invention, only one of the actuator ports is initially connected to the return port in the event of a failure of the servo valve. Although this embodiment possesses the advantage of being of very simple construction, there may be some slight resistance to movement of the actuator as a result of the failure to immediately vent both of the actuator ports to return immediately upon detection of the failure and movement of the sleeve. For applications where this slight resistance may be considered objectionable, a second embodiment of the invention may be used. In this second embodiment, means are provided which are responsive to the failure of the actuator valve for connecting both the first and second actuator openings to the return port. More particularly, a bypass valve is provided which is responsive to the failure of the actuator valve for providing communication between the actuator ports. This assures that both of the actuator ports will be connected to the return conduit upon a failure of the actuator valve. The bypass valve is preferably slidably mounted in the actuator valve.

The invention, both as to its organization and method of operation, together with further features and advantages thereof, may best be understood by reference to the following description taken in connection with the accompanying drawings, in which:

*Brief description of the drawings*

FIG. 1 is a semidiagrammatic sectional view of one form of fail-safe servo valve of this invention with the actuator valve being illustrated in the neutral command position;

FIG. 2 is a view similar to FIG. 1 with the actuator valve moved to an operational position to the right in which operating fluid under pressure is supplied to the actuator;

FIG. 3 is a view similar to FIG. 1 illustrating the failed position of the valve with the actuator valve jammed to the sleeve in the neutral position and with an operational position input to the actuator valve to the right.

FIG. 4 is a view similar to FIG. 1 showing the failed position of the fail-safe valve with the actuator valve jammed to the sleeve at an operational position and with the slide and actuator valve moved to the left;

FIG. 7 is a view similar to FIG. 5 illustrating the valve in the failed position with the actuator valve jammed to the sleeve at the neutral position thereof and with an operational position input to the actuator valve to the right; and FIG. 8 is a view similar to FIG. 5 illustrating the valve with the actuator valve jammed to the sleeve at an operational position to the right and with the actuator valve and sleeve moved to the left.

Description of the preferred embodiments

Figure 5:
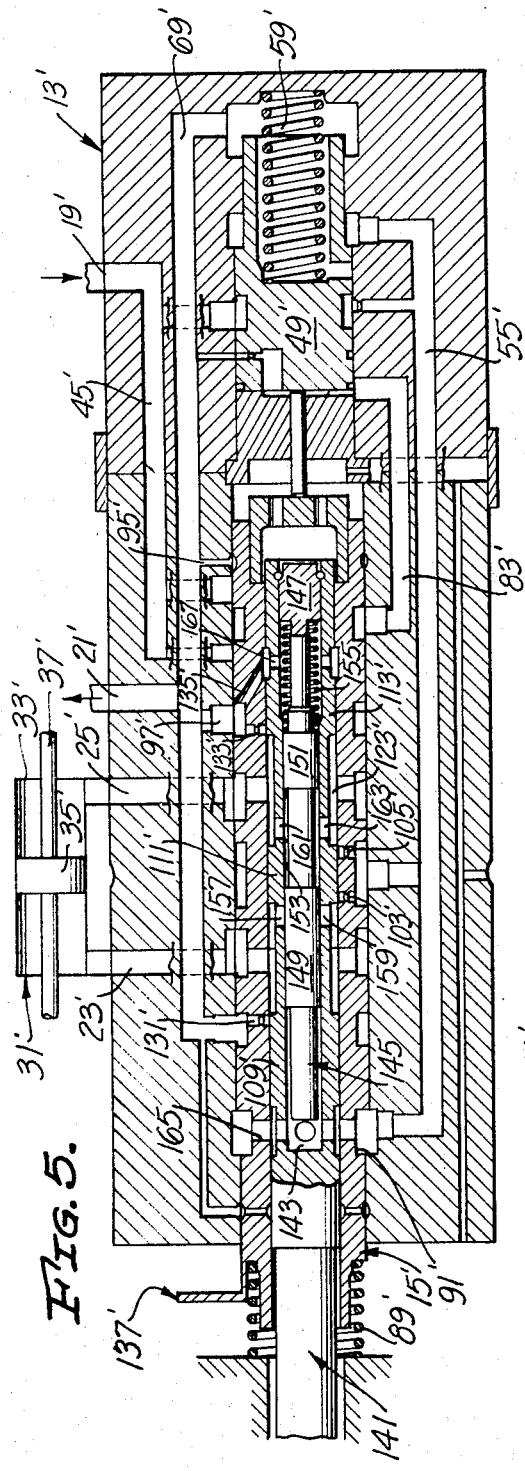
FIG. 5 is a view similar to FIG. 1 illustrating a second embodiment of the invention with the valve being shown in the neutral position.

Referring to the drawings and in particular to FIGS. 1–4 thereof, reference numeral 11 designates a preferred form of fail-safe servo valve constructed in accordance with the teachings of this invention. Generally, the valve 11 includes a housing 13 having a slidable sleeve 15 mounted for axial sliding movement within an axial bore 16 of the housing. The sleeve 15 is normally restrained against axial movement in the housing 13 and an actuator valve 17 is mounted for axial sliding movement within and relative to the sleeve 15.

The housing 13 has an inlet port 19 which is connectible to a source of operating fluid under pressure and a return port 21 which is connectible to a relatively low pressure return conduit or reservoir (not shown). The actuator valve 17 is slidable within the sleeve 15 to control the flow of operating fluid under pressure from the inlet port 19 to a pair of actuator ports 23 and 25 and also to control the flow of actuating fluid from the ports 23 and 25 to the return port 21. Actuator conduits 27 and 29 interconnect the ports 23 and 25, respectively, to an hydraulic actuator 31. Although the actuator 31 may be of various designs, it may include a cylinder 33, a piston 35 slidably mounted therein, and a connecting rod 37 secured to the piston. The actuator valve 17 controls the movement of the piston 35 and the connecting rod 37 by controlling the flow of operating fluid thereto. The connecting rod 37 is drivingly connected to a control surface (not shown) or to a suitable linkage for such control surface so that movement of the connecting rod 37 is transmitted to the control surface. Of course, the actuator 31 is operable to move the control surface in both directions.

FIG. 1 also diagrammatically partially illustrates a second fail-safe servo valve 11' which is identical to the servo valve 11 and is operable simultaneously therewith to control a second actuator (not shown) which also serves to operate the same control surface. The actuator valve 17 is interconnected to the actuator valve or the servo valve 11' so that both of the actuator valves are operable simultaneously from a single control member (not shown) in the cockpit of the aircraft. Thus, in the event that one of the servo valves 11 or 11' should fail, the other of these valves is operable to control the particular control surface. In the event of such a failure, it is desirable to completely prevent the actuator of the failed servo valve from exerting any influence on the control surface so that the operational servo valve and its actuator can freely operate the control surface. The present invention provides a servo valve that efficiently accomplishes this purpose.

The housing 13 may include two housing sections 39 and 41 fastened together by a suitable connector 43. The housing 13 has an inlet passage 45 extending from the inlet port 19 to the axial bore 16 in the housing 13. An inlet or selector valve 49 is slidably mounted in the bore 16 at the righthand end thereof as viewed in FIG. 1. The inlet valve 49 is movable between a normal position shown in FIGS. 1 and 2 and a failed position shown in FIG. 3. The inlet valve 49 has an annular groove 51 which provides communication between an inlet extension passage 53 and passage means 55 when the inlet valve passage is in the normal position shown in FIG. 1. Thus, operating fluid under pressure normally passes from the inlet port 19 through the inlet extension passage 53, the annular groove 51, to the passage means 55.

The inlet valve 49 has a hollow stem portion 57 which receives a spring 59 which urges the valve 49 to the left as viewed in FIG. 1 into engagement with an abutment 61 suitably clamped between the two housing sections 39 and 41. The stem portion 57 has an annular shoulder 63 which is normally supplied with operating fluid under pressure via the passage means 55. An aperture 65 extends radially through an inner portion of the stem portion 57 and is closed by the wall of the bore 16 when the valve 49 is in the normal position thereof. The outer end 57 is received in a chamber 67 which is maintained in communication with the return port 21 by a return passage 69.

The inlet valve 49 has a pressure-responsive face 71 on the lefthand end thereof which is engageable with the abutment 61 and a pin or slidable stop 73 which is slidably mounted in the abutment 61. When the valve 49 is in the normal position thereof, operating fluid at return pressure is supplied to the face 71 thereof through a passage 75 in the housing 13 and a choking orifice 77 in the valve 49. With the valve 49 in the normal position thereof, the force of the spring 59, the force of the operating fluid under pressure acting on the shoulder 63, and the force of the operating fluid at return pressure acting on the righthand end of the stem portion 57 urge the valve to the left into engagement with the abutment 61. Operating fluid at return pressure acts on the pressure-responsive face 71 of the valve 49 and tends to move the valve to the right. However, this force is not sufficient under normal operating conditions to move the valve 49 to the right.

The inlet passage 45 has two other inlet extensions 79 and 81 which are spaced axially from each other and communicate with a section 82 of the bore 16. A pilot valve passage 83 provides communication between the pressure-responsive face 71 and the section 82 of the bore 16 intermediate the inlet extensions 79 and 81. The sleeve 15 has an annular groove or pilot valve 85 which normally communicates with the passage 83 and lies intermediate the inlet extensions 79 and 81. Thus, when the valve 11 is operating normally, the sleeve 15 prevents operating fluid at supply pressures from being transmitted through the passage 83 to the pressure-responsive face 71. As is more fully explained hereinbelow, when a failure of the valve occurs, the sleeve 15 is moved axially in the bore 16 so that the pilot valve or groove 85 is caused to interconnect the passage 83 with one of the inlet extensions 79 or 81. When this occurs, operating fluid at supply pressure passes through the passage 83 and acts on the face 71 of the valve 49 and moves the latter to the right to the position shown in FIG. 3.

The sleeve 15 has an apertured cap 87 secured to the right end thereof. When the valve is operating normally, the forces acting on the inlet valve 49 cause the latter to maintain the pin 73 in the position shown in FIG. 1 in which the pin engages the cap 87 and restrains the sleeve 15 from moving to the right. It is apparent that the force of the spring 59 and the force caused by the operating fluid acting on the valve 49 as described hereinabove act through the pin 73 on the sleeve 15.

A spring 89 acts on the left end of the sleeve 15 and urges the latter to the right into engagement with the pin 73. The sleeve 15 has an annular groove 91 adjacent the left end thereof which is so dimensioned as to provide a differential area which will tend to urge the sleeve 15 to the right when fluid under pressure acts thereagainst. Thus, as shown in FIG. 1, the portion of the sleeve 15 to the left of the groove 91 is of lesser cross sectional area than the portion of the sleeve 15 to the right of the groove 91. As is apparent from viewing FIG. 1, the passage means 55 will normally supply operating fluid under pressure to the groove 91 to assist the spring 89 in urging the sleeve 15 to the right into engagement with the pin 73.

The housing 13 is immersed in a case (not shown) of fluid at case pressure which is substantially equal to return pressure. A section 92 of the bore 16 intermediate the right end of the sleeve 15 and the abutment 61 partially defines a chamber 93. Operating fluid at case pressure is to be admitted to the chamber 93 through passages 94, 94a and 94b and acts on the right end of the sleeve 15. Even if the sleeve 15 is moved to the left, a fluid passage 95 will remain blocked (FIG. 4) and will not supply operating fluid from the return passage 69 to the chamber 93. Various passages such as the passage 95 and a passage 96 assure that any leakage at the interfaces between the various components of the valve will be to the case.

It is important that the strength of the springs 59 and 89 and the sizes of the pressure-responsive areas on the valve 49 and the sleeve 15 be carefully selected so that in the event of a failure of the valve the sleeve 15 will be substantially freely slidable within the bore 16. By way of illustration, the spring 89 and the spring 59 may exert forces of 8 and 16 pounds, respectively. When the valve 11 is operating normally, the sleeve 15 will be urged to the left by a force of 200 pounds caused by pressure acting on the shoulder 63 and the spring 89 and the differential area formed by the groove 91 will exert a 100-pound force tending to move the sleeve 15 to the right. As explained more fully hereinbelow, in case of a failure and consequent axial movement of the sleeve 15, subsequent axial movement of the sleeve is substantially unrestricted.

As shown in FIG. 1, the return passage 69 has two return passage extensions 97 and 99, both of which communicate with the bore 16 at axially spaced areas therealong. The sleeve 15 and the actuator valve 17 are provided with appropriately sized and spaced grooves and passages to allow the valve 17 to selectively interconnect the passage means 55 with the actuator ports 23 and 25. Thus, the sleeve 15 is provided with an annular supply groove 101 and a pair of spaced orifices or metering slots 103 and 105 extending radially inwardly of the groove 101.

The actuator valve 17 has several axially spaced lands 107, 109, 111, 113, and 115, the spacing being provided by annular grooves 117, 121, 123, and 125, respectively. In the neutral position of the actuator valve 17 shown in FIG. 1, the land 111 blocks the metering slots 103 and 105 so that no operating fluid is supplied to the actuator 31.

The sleeve 15 also has two sets of passages and grooves 127 and 129 on either side of the supply groove 101 and which are normally in communication with the actuator ports 23 and 25, respectively. The sleeve 15 is also provided with two sets of orifices and grooves 131 and 133 which are normally in communication with the return passage extensions 99 and 97, respectively. A lateral passage 135 interconnects the passage and orifices 133 and the groove 125.

In normal operation of the device, the sleeve 15 will be restrained against axial movement and maintained in the position shown in FIG. 1. The valve 17 is slidable axially in the sleeve 15 to control the flow of operating fluid to the actuator 31 and hence control the movement of the control surface. In the position shown in FIG. 1, the land 111 blocks the metering slots 103 105 and prevents any of the operating fluid at supply pressure from being supplied to the actuator 31. Similarly, the actuator ports 23 and 25 cannot drain to return through the return passage extensions 97 and 99 because the lands 109 and 113 block both of the orifices and grooves 131 and 133. Thus, in the neutral position the actuator 31 maintains the status quo.

If it is desired to impart movement to the control surface, the pilot actuates the appropriate mechanism to cause relative axial movement between the valve 17 and the sleeve 15. With reference to FIG. 2, assuming that the actuator valve 17 is moved to the right, the metering slot 103 is uncovered by the land 111 to allow operating fluid under pressure to pass from the passage means 55, through the metering slot 103, around the groove 121, through the passages and groove 127, through the actuator port 23, to the actuator 31. Simultaneously, the land 113 is moved to the right a sufficient distance to uncover the passages and orifice 133. This permits the operating fluid to the right of the piston 35 to be expelled from the cylinder 33 through the actuator port 25, the passages and groove 129, the groove 123, orifice and groove 133, to the return passage 69. As long as the actuator valve 17 remains in this position, operating fluid will be continuously supplied to and expelled from the actuator 31 in this manner. It is apparent that by moving the actuator valve 17 to the left a sufficient distance, the metering slot 105 will be uncovered to allow operating fluid to be supplied to the other side of the piston 35 through the passages and orifice 129 and the actuator port 25. Simultaneously, the land 109 would uncover the passages and orifice 131 to allow the operating fluid on the left side of the piston 35 to be expelled from the cylinder 33 through the actuator port 23, the passages and groove 127, the groove 121, the orifice and groove 131, to the return passage extension 99.

If the actuator valve 17 should fail by jamming or sticking to the sleeve 15, the sleeve would move axially in the bore 16 with the valve 17. Assuming that such jamming occurs with the valve 17 at the neutral position shown in FIG. 1 and that the actuator valve 17 is being moved to the right, then the sleeve 15 will be forced to the right to the position shown in FIG. 3. It is preferred that the sleeve 15 only be movable with the actuator valve 17 in the event that a very substantial jamming or sticking occurs. Accordingly, the sizes of the springs 89 and 59 and the sizes of the various differential areas are appropriately chosen so that a force of, for example, 100 pounds, will be required to move the sleeve 15 axially out of the position shown in FIG. 1.

Assuming that the sleeve 15 is moved to the right, the groove 85 will, after a very small amount of axial movement of the sleeve 15, provide communication between the inlet extension 81 and the passage 83. This allows operating fluid at supply pressure to pass from the inlet extension 81 around the groove 85 and through the passage 83 to the pressure-responsive face 71 of the inlet valve 49. The force exerted by the operating fluid at supply pressure on the face 71 is sufficient to overcome the combined force of the spring 59 and of the fluid pressures acting on the shoulder 63 and the rear face of the stem portion 57. Thus, the inlet valve 49 is forced to the right to the position shown in FIG. 3. This causes several things to occur. First, the groove 51 is moved out of communication with the inlet extension passage 53 and the passage means 55. The effect of this is to shut off the supply of operating fluid except for the portion thereof which is supplied through the passage 83 to act on the face 71. However, movement of the inlet valve 49 also closes the passage 75 so that none of the operating fluid supplied to the face 71 can escape. Operating fluid under pressure is also supplied to the face 71 via the passage 53 and the orifice 77.

Secondly, movement of the inlet valve 49 to the failed position moves the aperture 65 into communication with the passage means 55. The passage 55 is, therefore, connected to return through the chamber 67 and the return passage 69. The stem portion 57 may be apertured to allow the operating fluid in the passage means 55 to drain into the chamber 67.

Third, movement of the inlet valve 49 to the failed position removes the forces which had heretofore been acting on the sleeve 15 through the valve 49. Thus, the only forces remaining tending to move the sleeve 15 to the left is the force of the operating fluid at supply pressure acting on the area of the right end of the pin 73 and the force exerted by the operating fluid at return pressure in the chamber 93.

Movement of the sleeve 15 to the right moves the passage and groove 129 to the right to interconnect the actuator port 25 and the passage extension 97. Thus, the operating fluid on the right side of the piston 35 in the actuator 31 is allowed to drain to the return port 21. It is apparent that the movement of the sleeve 15 to the left from the position shown in FIG. 3 will cause the passage and groove 127 to interconnect the actuator port 23 and the return passage extension 99. At this time the operating fluid on the left side of the piston 35 will be opened to return pressure through passages and groove 127, passage 99 and return passage 69.

If the valve 17 jams to the sleeve 15, the valve 17 and the sleeve will be movable together as a unit without any substantial interference or binding of the sleeve. When the valve 11 has failed, the only forces urging the valve 17 and sleeve 15 to the left will be the force of the operating fluid at supply pressure acting on the right end of the pin 73 and the force of the operating fluid at return pressure in the chamber 93. The opposing force is the force of the spring 89 plus the force of the operating fluid at return pressure acting on the differential area provided by the annular groove 91. By appropriately selecting the area of the pin 73 and the differential area formed by the groove 91, and by appropriately maintaining the supply and return pressures at predetermined values, and by selecting the spring 89 of the requisite force, the forces acting on the sleeve 15 in opposite axial directions will be balanced or substantially balanced so that the net effect is that the sleeve 15 is freely slidable in the housing after failure has occurred.

It is apparent that if failure of the actuator valve 17 occurs while the valve is in the operational position of FIG. 2 that similar action will result. Thus, if seizure should occur with the components of the valve 11 in the position shown in FIG. 2, the operating fluid in the cylinder 33 on the right side of the piston 35 would flow to the return port 21 through the groove and passages 129 and the orifices and groove 133. As the inlet valve 49 moves automatically to the failed position shown in FIG. 3, no operating fluid under pressure would be supplied to the actuator 31.

When the valve 11 has failed and effectively loses any ability to control the movements of the control surface, the control function is then performed entirely by the servo valve 11' (FIG. 1). However, as the actuator valve 17 is mounted for movement with the actuator valve in the servo valve 11', the actuator valve 17 and the sleeve 15 will continue to move as the pilot continues to change the position of the control surface. Thus, the actuator valve 17 and the sleeve 15 will move back and forth in the bore 16 even after failure thereof has occurred. Also, the piston 35 will be driven within the cylinder by the control surface which in turn is being operated by the operational valve 11'.

With the present invention, such movement of the actuator valve 17 and the sleeve 15 do not affect the actuator 31 or movements of the control surface. It is important that such movement of the piston 35 not substantially resist or otherwise unduly influence movement of the control surface. As the ports 23 and 25 are opened to return in response to a valve failure, the actuator 31 acts to damp movement of the control surface as the piston 35 forces the operating fluid from the cylinder 33. This damping action does not unduly resist or otherwise adversely affect operation of the control surface.

FIG. 4 shows the valve 11 after it has failed while in the operational position of FIG. 2 and after the actuator valve 17 and the sleeve 15 have been moved to the left as a unit during subsequent operation of the servo valve 11'. As shown in FIG. 4, the inlet valve 49 is retained in the failed position as operating fluid at supply pressure is supplied to the face 71 through the groove 85 and the inlet extension 79. Thus, the supply of operating fluid under pressure to the valve 11 remains shut off. Likewise, the forces acting on the inlet valve 49 have no influence on the movement of the sleeve 15. The operating fluid on the left side of the piston 35 and the cylinder 33 is allowed to flow to the return passage 69, through the passages and groove 127, and the return passage extension 99. It is apparent, therefore, that subsequent sliding movement of the sleeve 15 will have no adverse effect on the operation of the operational servo valve 11'.

For the purposes of simulating a failure of the valve 11 and to assure that the sleeve 15 has not become jammed within the bore 47, a mechanical checker 137 is provided. The mechanical checker 137 may take many forms so long as it is drivingly connected to the sleeve 15. It is also important that a portion thereof be exposed at a relatively accessible area so that the movement of such portion will impart movement to the sleeve 15. In the embodiment illustrated, the mechanical checker is shown as having a tab 139 which may be grasped and used to slide the sleeve 15 in the bore 16. Of course, movement of the sleeve 15 causes a simulated failure in that the groove 85 is moved to provide communication between the bypass passage 83 and one of the inlet extensions 79 or 81.

After the valve 11 has failed, it can be reset by shutting off the supply of operating fluid to the port 19 by an external valve (not shown) and opening all of the passages to return. This allows the springs 59 and 89 to return the sleeve 15 to the normal position (FIGS. 1 and 2).

FIGS. 5–8 show a second embodiment of the fail-safe servo valve of this invention. Although the embodiment of FIGS. 1–4 is of somewhat simpler construction, the embodiment of FIGS. 5–8 is particularly advantageous in that it connects both of the actuator ports thereof to return pressure as soon as failure of the valve occurs.

Substantial portions of the second embodiment are identical to the first embodiment and such identical parts are designated by corresponding primed reference characters in FIGS. 5–8. Generally, the construction of FIGS. 5–8 differs from the first embodiment in that it includes an actuator valve 141 having an axial bore 143 therein and a bypass valve 145 slidably mounted in the bore 143. Generally, it is the function of the bypass valve 145 to automatically provide communication between the actuator ports 23' and 25' upon seizure of the actuator valve 141 within the sleeve 15'. When slight movement of the sleeve 15' occurs, one of the actuator ports 23' or 25' is connected to the return port 21'. However, as the bypass valve 145 interconnects the actuator ports 23' and 25', both of the actuator ports are in communication with the return port 21'.

More particularly, the bore 143 of the actuator valve 141 is closed by a plug 147. The bypass valve 145 has a pair of lands 149 and 151 which are axially spaced by an annular groove 153. A coil spring 155 acts between the plug 147 and the land 151 to urge the bypass valve 145 to the left as viewed in FIG. 5. As shown in FIG. 5, the left end of the bypass valve 145 is spaced from the inner end of the bore 143 when the valve is operating normally.

The actuator valve 141 further differs from the actuator valve 47 of the first embodiment in that it is provided with four radially extending ports 157, 159, 161, and 163. With the bypass valve 145 in its normal operating position shown in FIG. 5, the ports 157 and 159 are blocked and the ports 161 and 163 provide communication between the groove 153 and the groove 123'.

When the fail-safe valve is operating normally, the bypass valve 145 is maintained in the normal position shown in FIG. 5 by operating fluid under pressure which flows from the passage means 55' through groove and passages 165 into the bore 143. Operating fluid at the return pressure flows from the return passage extension 97' through the lateral passage 135' and a groove and passages 167 in the valve 141 to act on the right end of the bypass valve 145. However, the force exerted by the operating fluid at supply pressures on the left end of the bypass valve 145 is sufficient to urge the bypass valve into engagement with the plug 147 against the biasing section of the spring 155 and the operating fluid at return pressure acting on the right end of the bypass valve.

FIG. 5 shows the neutral position of the valve. In this position the land 111' seals the metering slots 103' and 105' in the same manner as described above in connection with the first embodiment to prevent flow of operating fluid under pressure to the actuator 31'. Similarly, the lands 109' and 113' seal the grooves and orifices 131' and 133' as described above to prevent the operating fluid from flowing from the actuator 31' to the return port 21'.

Figure 6:
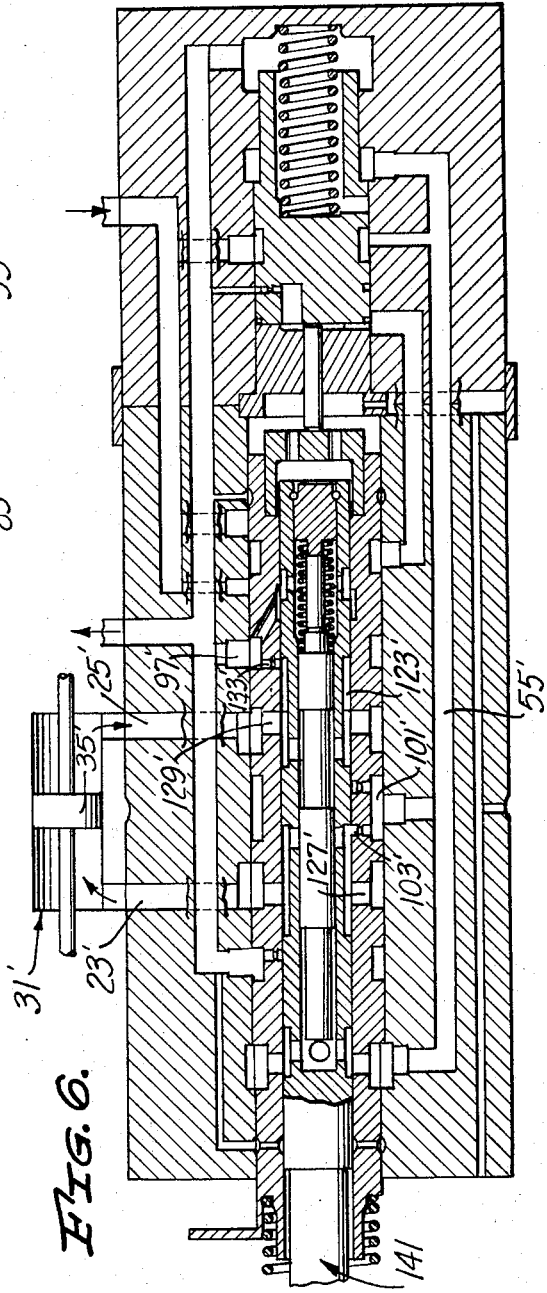
FIG. 6 is a view similar to FIG. 5 illustrating an operational position of the valve in which the input thereto moves the valve to the right.

Similarly, movement of the valve 141 to the right to the operational position shown in FIG. 6 causes operating fluid under pressure to flow from the passage means 55' through the supply groove 101', the metering slot 103', passages and groove 127' to the actuator port 23'. Operating fluid is expelled from the opposite side of the piston 35' through the actuator port 25', passages and groove 129', the groove 123' and groove and orifice 133' to the return passage extension 97'.

In the event that the actuator valve 141 sticks to the sleeve 15', the sleeve 15' will move in the same manner as the sleeve 15 and the inlet valve 49' will function in the same manner as the inlet valve 49 described above in connection with the first embodiment. Thus, operating fluid in the passage means 55' is at return pressure when the inlet valve 49' moves to the failed position shown in FIG. 7. This causes operating fluid at return pressure to act on the left end of the bypass valve 145 and the force exerted thereby is sufficiently low to allow the spring 155 to urge the bypass valve to the left to the position shown in FIG. 7. Such movement of the bypass valve 145 moves the land 149 to allow the groove 153 to interconnect the ports 157, 159, 161, and 163. This provides communication from the actuator port 23' through the passages and groove 127', the groove 121', the ports 157 and 159, the groove 153, the ports 161 and 163, the groove 123' and passages and groove 129' to the actuator port 25'. Simultaneously, the actuator port 25' is placed in communication with the passage means 55', which is at return pressure, by the groove 101' on the slide 15'. Thus, both of the actuator ports 23' and 25' and therefore both sides of the piston 35' of the actuator 31' are open to return pressure immediately upon a failure of the servo valve. As both sides of the piston 35' are open to return pressure, the actuator 31' offers substantially no resistance to movements which are imparted thereto by the operational actuator through the control surface. Furthermore, in the embodiment of FIGS. 5–8 the actuator ports 23' and 25' are open to return pressures through the groove 101'. This permits bypassing of the relatively small orifices 131' and 133' which are normally used for opening of the actuator ports to return pressure. Thus, the actuator 31' will exert substantially no resistance on movements of the control surface.

FIG. 8 is a view similar to FIG. 4 of the first embodiment. FIG. 8 illustrates the relative positions of the components of the servo valve when a failure occurs in the operational position of FIG. 6 and after the sleeve 15' and the actuator valve 141 have been moved to the left in a subsequent control movement. It is apparent that notwithstanding such subsequent movement of the sleeve 15' and the actuator valve 141 as a unit, that the actuator 31' remains disabled from exerting any substantial controlling influence on the movements or retardation of movement of the control surface. More particularly, communication between the actuator ports 23' and 25' is still provided by passages and groove 127', the groove 121', the ports 157 and 159, the groove 153, the ports 161 and 163, the groove 123', and the passages and groove 129'.

In this instance, however, it is the actuator port 23' which directly communicates with the passage means 55' through the groove 101'.

The other operational characteristics of the embodiments of FIGS. 5–8, such as the free sliding capability of the sleeve 15' and the numerous functions of the selector valve 49' are identical to those functions described above in connection with the embodiment of FIGS. 1–4.

What is claimed is:

1. In a fail-safe servo valve for controlling the flow of operating fluid to an actuator, the combination of:
a housing having a supply port for receiving the operating fluid and a return port for returning the operating fluid from the housing, said housing also having first and second actuator openings for supplying the operating fluid to the actuator and for receiving the operating fluid from the actuator;
first valve means in said housing movable to control the flow of operating fluid from said supply port to said first and second actuator openings and from said first and second actuator openings to said return port;
a movable member in said housing movable in response to a failure of said first valve means;
means for normally retaining said movable member against movement relative to said housing; and
second valve means in said housing responsive to said movable member moving more than a predetermined amount for shutting off the supply of operating fluid to the actuator through said first and second openings.

2. A combination as defined in claim 1 wherein said movable member is a slidable sleeve and said first valve means is slidable in said sleeve relative thereto and said second valve means is responsive to movement of said first valve means and said slidable sleeve as a unit to halt the flow of the operating fluid to the actuator.

3. A combination as defined in claim 1 including means responsive to said movable member moving more than approximately said predetermined amount for connecting at least one of said actuator openings to said return port.

4. A combination as defined in claim 1, including means responsive to movement of said movable member for connecting said first and second actuator openings to said return port.

5. A combination as defined in claim 1 including mechanical checker means drivingly connected to said movable member to permit manual movement of said movable member more than said predetermined amount.

6. In a fail-safe servo valve for controlling the flow of operating fluid to an actuator, the combination of:
a housing;
a supply conduit in communication with the housing for supplying the operating fluid to the housing and a return conduit in communication with the housing for returning the operating fluid from the housing;
first and second actuator conduits for supplying the operating fluid from said housing to the actuator and for returning the operating fluid from the actuator to said housing;
a sleeve slidable in said housing;
biasing means for normally retaining said sleeve against substantial movement thereof;
first valve means slidable in said sleeve for controlling the flow of operating fluid from said supply conduit to said actuator conduits and from said actuator conduits to said return conduit, said sleeve being movable with said first valve means against the force of said biasing means upon the jamming of said first valve means in said sleeve; and
second valve means in said housing responsive to movement of said sleeve for shutting off the supply of operating fluid to the actuator conduits.

7. A combination as defined in claim 6 including means responsive to movement of said sleeve with said first valve means for connecting at least one of said actuator conduits to said return conduit.

8. A combination as defined in claim 6 wherein the force of said biasing means for normally retaining said sleeve is substantial, and including means responsive to movement of said sleeve for substantially reducing the force of said biasing means whereby said first valve means and said sleeve are thereafter relatively easily movable as a unit.

9. A combination as defined in claim 6 wherein said biasing means includes a first spring for at least partially retaining said sleeve against movement and for normally biasing said second valve to an open position to normally cause said second valve means to admit the operating fluid to said housing.

10. In a fail-safe servo valve connectible to a supply of operating fluid under pressure and operable to control the flow of operating fluid to an actuator, the combination of:
    housing means connectible to the supply of operating fluid under pressure;
    first valve means movable in said housing means to control the flow of the operating fluid to the actuator;
    a member in said housing means adjacent said first valve means and movable with said first valve means in at least one direction in response to a failure of said first valve means, said member normally being retained against movement in at least said one direction by a substantial force; and
    means at least partially within said housing means responsive to a predetermined amount of movement of said member in said one direction to substantially reduce said substantial force whereby said first valve means and said movable member are thereafter relatively easily movable in said one direction.

11. A combination as defined in claim 10 including second valve means in said housing responsive to the failure of said first valve means for shutting off the supply of the operating fluid flowing from said housing to the actuator.

12. A combination as defined in claim 11 wherein said housing is connectible to a return conduit and at least one actuator conduit interconnects said housing and the actuator and including means in said housing responsive to the failure of said first valve means for connecting the actuator conduit to the return conduit.

13. In a fail-safe servo valve connectible to a source of operating fluid under pressure and operable to the flow of the operating fluid to an actuator, the combination of:
    a housing connectible to the source of operating fluid under pressure;
    valve means in said housing movable in both directions along a path to control the flow of the operating fluid to the actuator;
    a slidable sleeve in said housing surrounding said valve means;
    means for normally restraining said sleeve against movement along said path to normally allow said valve means to move relative thereto to control the flow of the operating fluid to the actuator, said valve means and said sleeve being movable as a unit against the force of said restraining means in response to jamming of the valve means in said sleeve; and
    means mounted on said housing responsive to a predetermined amount of movement of said sleeve along said path to substantially free said sleeve of forces tending to substantially restrain movement thereof along said path whereby said valve means and said sleeve are thereafter relatively easily movable as a unit in said one direction.

14. A combination as defined in claim 13 wherein said restraining means includes first spring means urging said sleeve in one direction along said path and second spring means urging said sleeve in the other direction along said path.

15. A combination as defined in claim 13 wherein said restraining includes first means associated with said sleeve for receiving the operating fluid under pressure to allow the operating fluid under pressure to urge said sleeve in said one direction along said path, a movable stop member for preventing movement of said sleeve in said one direction along said path, second means associated with said movable stop member for causing the operating fluid under pressure to normally prevent movement of said stop member in said one direction, and means responsive to the jamming of said valve means and said sleeve to admit return pressure to both of said first and second means whereby said sleeve is thereafter relatively easily movable in said one direction.

16. In a fail-safe servo valve for controlling the flow of operating fluid to an actuator, the combination of:
    a housing having a supply port for receiving the operating fluid and a return port for returning the operating fluid from the housing, said housing also having first and second actuator openings for supplying the operating fluid to the actuator and for receiving the operating fluid from the actuator;
    first valve means in said housing for controlling the flow of operating fluid from said supply port to said first and second actuator openings and from said first and second actuator openings to said return port; and
    means at least partially within said housing responsive to failure of said first valve means for connecting said first and second actuator openings to said return port.

17. A combination as defined in claim 16 wherein said last-mentioned means includes bypass valve means slidable in said first valve means, said bypass valve means normally being closed and being openable to interconnect said first and second actuator openings in response to the failure of said first valve means and passage means in said housing for providing communication between one of said actuator openings and said return port.

18. A combination as defined in claim 17 including a slidable sleeve surrounding said first valve means and means for normally retaining said slidable sleeve against substantial movement relative to said housing, said sleeve having a groove thereon and being movable with said first valve means in response to the failure of the valve means for causing said groove means to form at least a portion of said passage means whereby communication is provided between one of said actuator openings and said return port.

19. A combination as defined in claim 16 including second valve means in said housing responsive to the failure of the first valve means for shutting off the supply of operating fluid to the actuator through said first and second openings, said means for connecting being responsive to the shutting off of the supply of actuating fluid to the actuator through said first and second openings to connect both of said actuator openings to said return port.

20. In a fail-safe servo valve for controlling the flow of operating fluid under pressure to an actuator, the combination of:
    a housing having an inlet passage for receiving the operating fluid under pressure and a return port for returning the operating fluid, said housing also having first and second actuator openings for supplying the operating fluid to and receiving the operating fluid from the actuator;
    inlet valve means for controlling the flow of fluid through said inlet passage, said inlet valve means being movable between an open position in which the operating fluid flows through said inlet passageway and a closed position in which said inlet valve means blocks said inlet passageway, said inlet valve means normally being in said open position;
    first passage means in said housing interconnecting said inlet valve means and said actuator openings;
    actuator valve means at least partially within said housing for controlling the flow of operating fluid from said first passage means to said actuator openings; and means at least partially within said housing responsive to a failure of said actuator valve means for closing said inlet valve means to shut off the flow of operating fluid to said first passage means and to the actuator.

21. A combination as defined in claim 20 wherein said inlet valve means has a pressure-responsive face and is movable to the closed position thereof in response to sufficient pressure acting thereagainst, the combination also including a pilot valve passage in said housing extending from said inlet passageway to said pressure-responsive face and normally closed pilot valve means responsive to the failure of said actuator valve means for opening said pilot valve passage to allow the operating fluid under pressure to act on said pressure-responsive face and move said inlet valve means to said closed position thereof.

22. A combination as defined in claim 21 including a slidable sleeve surrounding said actuator valve means and means for normally restraining said sleeve against movement, said pilot valve means including a grooved portion of said sleeve, said pilot valve means being openable in response to movement of said sleeve.

23. In a fail-safe servo valve for controlling the flow of operating fluid to an actuator, the combination of:
a housing having an inlet passage for receiving the operating fluid and a return port for returning the operating fluid from the housing, said housing also having an actuator opening for supplying the operating fluid to the actuator;
first passage means in said housing for interconnecting said inlet passage to said actuator opening;
return passage means in said housing for interconnecting said first passage means in said return port;
selector valve means at least partially within said housing having a normal position in which said first passage means is connected to said inlet passage and said return passage means is blocked and a failed position in which said return passage means is connected to said first passage means and said inlet passage is blocked;
actuator valve means at least partially within said housing for controlling the flow of operating fluid from said first passage means to said actuator port;
means at least partially within said housing responsive to failure of said actuator valve means for moving said selector valve means from said normal position to said failed position whereby said first passage means is connected to said return port; and
means at least partially within said housing responsive to the failure of the actuator valve means for providing communication between said actuator opening and said first passage means whereby said actuator opening is opened to the return port.

References Cited

UNITED STATES PATENTS

| | | | |
|---|---|---|---|
| 2,631,571 | 3/1953 | Parker | 137—625.68 |
| 2,771,907 | 11/1956 | Joy | 137—625.48 XR |
| 3,152,610 | 10/1964 | McAfee | 137—625.69 XR |
| 3,253,613 | 5/1966 | Richolt | 137—596 |

HENRY T. KLINKSIEK, *Primary Examiner.*

U.S. Cl. X.R.

137—614.19